United States Patent [19]

Czarnowski

[11] Patent Number: 4,980,959

[45] Date of Patent: Jan. 1, 1991

[54] INSTALLATION TOOL FOR HELICAL COIL INSERTS

[75] Inventor: Leonard J. Czarnowski, Torrance, Calif.

[73] Assignee: VSI Corporation, Chantilly, Va.

[21] Appl. No.: 470,460

[22] Filed: Jan. 26, 1990

[51] Int. Cl.[5] .............................................. B23P 19/04

[52] U.S. Cl. ...................................... 29/240.5; 29/227

[58] Field of Search ............................... 29/240.5, 227

[56] References Cited

U.S. PATENT DOCUMENTS 4,172,314 10/1979 Berecz et al. ...................... 29/240.5

4,768,270 9/1988 Czarnowski ....................... 29/240.5

*Primary Examiner*—Robert C. Watson

*Attorney, Agent, or Firm*—Irving Keschner

[57] ABSTRACT

A tool for use in automatically installing a helical coil insert to a preselected depth in a tapped hole formed in a workpiece. The tool includes a tubular tool body carrying an insert near its lower end, and a mandrel threadedly received in the tool body for engaging the insert and rotatably advanced into the tapped hole by a driver device. An adjusting sleeve encircles the mandrel and is threaded to a selected position in the tool body, to serve as a stop for further advancement of the mandrel, thereby controlling the depth to which the insert is installed. The sleeve's position can be adjusted quickly and conveniently without disassembling the front assembly of the tool from the driver device.

9 Claims, 3 Drawing Sheets

INSTALLATION TOOL FOR HELICAL COIL INSERTS

BACKGROUND OF THE INVENTION

1. Field of the Invention

This invention relates generally to tools for installing helical coil inserts into tapped holes, and, more particularly, to tools having means for adjusting the depths to which such inserts are installed without requiring disassembling the front portion of the tool from the back end of the tool.

2. Description of the Prior Art

Helical coil inserts are commonly installed into tapped holes of a workpiece such that threaded fasteners, e.g., screws, thereafter can be held more securely. The inserts are frequently installed in relatively soft materials such as aluminum, to improve the gripping of threaded fasteners made of relatively hard materials such as various steel alloys.

Helical coil inserts of this kind are usually installed by compressing them into a smaller diameter and then rotatably threading them into the tapped holes. Once installed, the inserts expand from their compressed diameters and thereby press radially outwardly against the tapped holes and are held securely in place.

Tools for installing the helical coil inserts are typically driven by an air motor and include a tubular tool body having a threaded opening extending along its axis and having means at one end for carrying an insert. A mandrel is received within the threaded opening and is rotatably advanced by the air motor into engagement with the insert. Further advancement of the mandrel forces the insert through a prewinder, which reduces the insert's diameter, and from there into a tapped hole in an adjacent workpiece.

The insertion depth of the helical coil wire insert is controlled by limiting the distance to which the mandrel can be advanced. Typically, this has been accomplished using sleeve of a desired length which is positioned between the tubular tool body and a flange on the mandrel. In order to change the insert's installation depth, the mandrel had to be removed from the tool body and a different-length sleeve or spacer put in position around the mandrel. An exemplary tool of this kind is shown in U.S. Pat. No. 3,111,751 to Eddy.

The need to remove the mandrel from the tool body in order to adjust the insert's installation depth is unduly time consuming. This has been a particular problem when a large number of inserts have to be installed at a variety of depths.

Another approach has also been used previously, with equal difficulty. A stop collar has been used to limit the distance the mandrel could travel and thereby set the depth to which the helical coil insert could be installed. A set screw secured the collar in a selected position on the mandrel, but the collar would often slide up or down the mandrel after repeated use, because of vibrational forces and the force of the collar jamming against the tool body.

U.S. Pat. No. 4,768,270 to Czarnowski discloses an installation tool that quickly and conveniently allows the adjustment and setting of insertion depths without, inter alia, having to disengage the mandrel from the tool body. The tool includes a tubular tool body having a threaded opening extending along its axis and having means at its leading end for carrying a helical coil insert, in alignment with the threaded opening. A mandrel is located in the threaded opening for engagement with the insert, and driving means applies a torque to the mandrel sufficient to install the insert into a tapped hole. The tool further includes a sleeve threadedly received in the threaded opening of the tubular body, encircling the mandrel. The sleeve is engaged by an annular shoulder on the driving means, to prevent further advancement of the driving means and mandrel and thereby limit the depth to which the insert is installed in the tapped hole. The insertion depth can be adjusted by controllably threading the sleeve into or out of the tool body. The sleeve has two flats interrupting the threads, on opposite sides of the sleeve. A set screw threaded through the tubular body can be tightened against one of the flats to secure the sleeve's position within the tool body.

Although the tool disclosed in U.S. Pat. No. 4,768,270 provides significant advantages over prior installation tools, the fact that the front end assembly must be removed from the adapter to expose the slotted upper end of the sleeve to a spanner wrench which in turn grips and threadedly turns the sleeve into or out of the tool body increases the required set-up time during installation of the inserts into workpieces of various thicknesses.

There is thus a need for an installation tool for helical coil inserts that quickly and conveniently allows the adjustment and setting of insertion depths. In particular, there is a need for a tool that can be adjusted without having to disengage the mandrel driver from the rest of the tool body to reduce the setup times for insert installation.

SUMMARY OF THE PRESENT INVENTION

The present invention comprises a tool for installing helical coil inserts into tapped holes in a workpiece, the tool being quickly and conveniently adjustable to control the depth to which each insert is installed. The tool includes a tubular tool body having a threaded opening extending along its axis and having means at its leading end for carrying a helical coil insert, in alignment with the threaded opening. A mandrel is located in the threaded opening for engagement with the insert, and driving means applies a torque to the mandrel sufficient to install the insert into a tapped hole. The tool further includes a sleeve threadedly received in the threaded opening of the tubular body, encircling the mandrel. The sleeve is engaged by an annular shoulder on the driving means, to prevent further advancement of the driving means and mandrel and thereby limit the depth to which the insert is installed in the tapped hole. A cutout section is provided in the leading end of the tool to allow access to the adjusting sleeve. The insertion depth is adjusted without requiring removal of the mandrel or the mandrel driver, by rotating the adjusting sleeve using a pin or hex key in holes provided on flats formed on the sleeve. A set screw threaded through the tubular body can be tightened against one of the flats to secure the sleeve's position within the tool body.

The present invention thus provides an improved installation tool for helical coil inserts which does not require disassembling the front end of the tool from the mandrel driver to adjust the depth of the insert installation, thus reducing set-up time and the necessity of worker intervention during installation of inserts into workpieces of varying thicknesses to a minimum, thus in turn reducing the cost and complexity of the installation process.

BRIEF DESCRIPTION OF THE DRAWINGS

For a better understanding of the invention as well as other objects and further features thereof, reference is made to the following description which is to be read in conjunction with the accompanying drawing wherein.

DESCRIPTION OF THE PREFERRED EMBODIMENT

Figure 3:
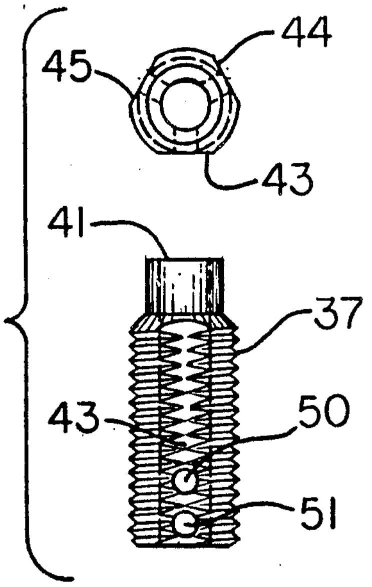
FIG. 3 is a side elevational view of the novel sleeve component utilized in the installation tool of the present invention.

With reference now to the drawings there is shown a tool 10 for use in installing a helical coil insert 11 into a tapped hole 13 in a workpiece 15. The tool includes a tubular tool body 17 having an opening 18 extending axially through its entire length.

An insert is carried in a recess 19 formed adjacent the body's leading end and coaxial with the body's opening 18. An elongated, threaded mandrel 21 engages threads 23 (FIGS. 5–7) in the body opening, immediately adjacent the insert recess, such that rotation of the mandrel relative to the body advances the mandrel's leading end into engagement with the insert. Further rotation of the mandrel forces the insert through a threaded compression section or prewinder 25 of the tool body, which compresses the insert's diameter for threaded insertion into the tapped hole. After the insert has been installed to a predetermined depth, the mandrel is rotated in the reverse direction, to withdraw from the tapped hole. The insert expands into tight engagement with the hole and thereafter can serve as a hard surface for securely gripping the threads of a threaded fastener, e.g., a screw (not shown). In accordance with the teachings of the present invention, a cut out, or window, portion 26 is formed in tubular body portion 17 to allow access to opening 18 for the reasons set forth hereinafter.

The mandrel 21 is rotatably driven by an air motor that includes an adapter portion 27 (FIG. 2) coupled to the tool body's trailing end. The adapter's leading end is secured to the tool body 17 by a nut 28 that grasps two annular flanges 29 and 31 projecting outwardly from the body. A clutch assembly 33 is interposed between the air motor and the mandrel's trailing end, for coupling torque to the mandrel 21. Rotation of the motor thus threads the mandrel downwardly through the tool body, until the mandrel's leading end engages the insert 11 and threads it through the prewinder 25 into the tapped hole 13. The clutch assembly has a diameter larger than that of the mandrel, such that its lower end forms an annular shoulder 35.

In accordance with the invention, the installation tool further includes a sleeve 37 encircling the mandrel 21 and threaded into an upper section 39 of the tool body's opening 18. An upper annular shoulder 41 of the sleeve is positioned to be engaged by the shoulder 35 of the clutch assembly 33, which limits further advancement downwardly of the clutch assembly. After a few additional turns, the clutch assembly ceases to couple the motor's rotation to the mandrel and further threading of the insert 11 into the tapped hole 13 likewise ceases. Operation of the clutch assembly is described more fully below.

As shown in FIG. 3, the adjusting sleeve 37 includes threads on its exterior surface, to be threadable into or out of the tool body 17. This exterior threading is interrupted by three flats 43, 44 and 45 separated by 120 degrees for use in locking the sleeve in a selected position to the tool body. A set screw 47 is threaded through a threaded opening 49 in the body to abut against one of the sleeve's three flats. This prevents the sleeve from rotating and thereby locks it is place.

The adjusting sleeve 37 further includes two apertures 50 and 51 formed on flat 43 (two apertures not shown are also formed on each of flats 44 and 45). A hex key (a pin can also be used) 38 is inserted into one of the apertures in the flat accessible through window 26 enabling the sleeve to be rotatably threaded to a predetermined position. Window 26 provides a visible indication of the flats' circumferential location relative to the set screw 47 and threaded opening 49, the number of flat areas (three in preferred embodiment) being selected such that at least one is always visible through window 26. This in turn provides a rapid method for ensuring that the set screw always engages a flat area without removing the front end assembly from the adapter 27.

Threading the adjusting sleeve 37 inwardly or outwardly relative to the tool body 17 provides the installation tool its variability in setting the depth of the helical coil insert 11 to be positioned within the tapped hole 13. To the extent that the sleeve rises above the tool body's upper end the distance the mandrel can travel through the body is limited. This limits the depth that the insert will be set within the tapped hole. This adjustability is illustrated in FIGS. 5–7, which depict three exemplary depth settings, A, B and C, respectively.

Figure 5:
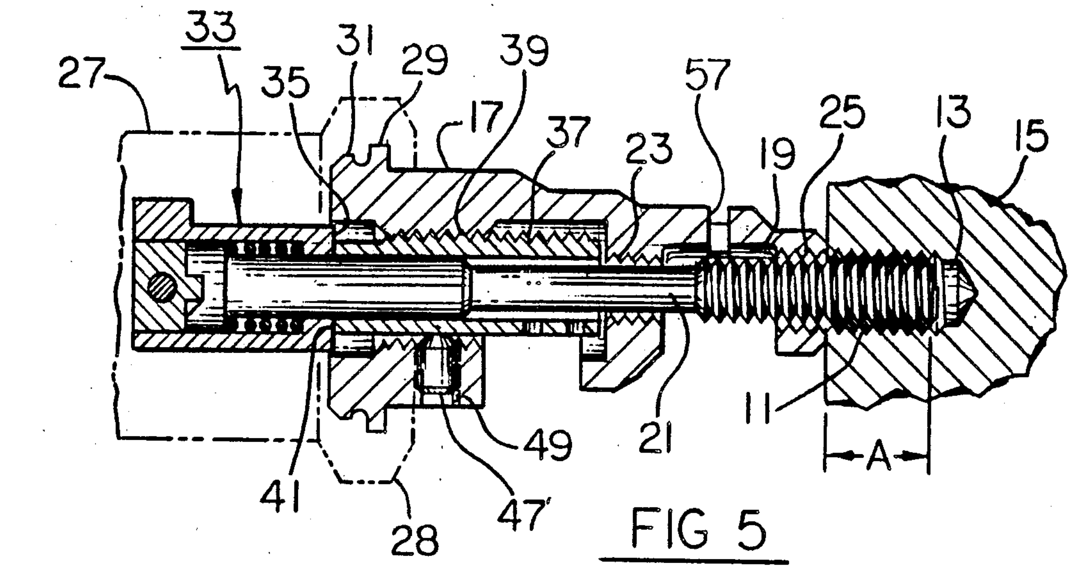
FIG. 5 is an enlarged sectional view of the installation tool, with the adjusting sleeve in its most inward position, resulting in the helical coil insert being installed to a maximum depth.

In FIG. 5, the adjusting sleeve 37 is positioned in its most retracted position, i.e., almost entirely within the tool body 17. The clutch assembly 33 is depicted with its shoulder 35 in contact with the sleeve's shoulder 41. The resulting insertion depth A of the helical coil insert 11 in the tapped hole 13 of the workpiece 15 is the deepest the installation tool can provide.

Figure 6:
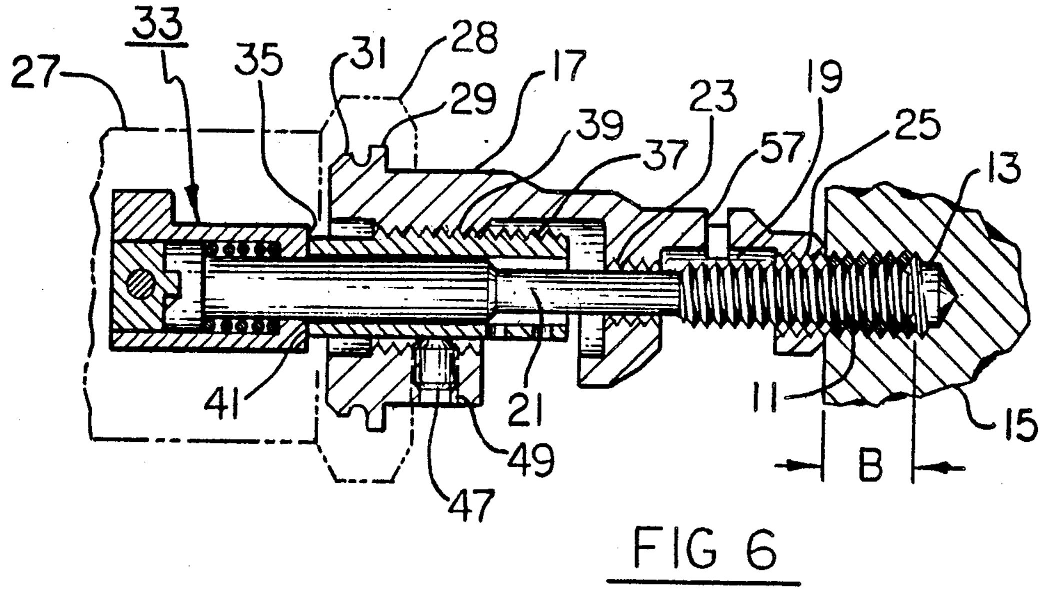
FIG. 6 is an enlarged sectional view of the installation tool, with the adjusting sleeve in an extended position from that of FIG. 5, resulting in the helical coil insert being installed to an intermediate depth.

In FIG. 6, the adjusting sleeve 37 is retracted from its FIG. 5 position such that the clutch assembly's shoulder 35 engages the sleeve's shoulder 41 sooner. The mandrel 21 is therefore not advanced as far as it was in FIG. 5, and the helical coil insert's insertion depth B is correspondingly shallower than the insertion depth A of FIG. 5.

Figure 7:
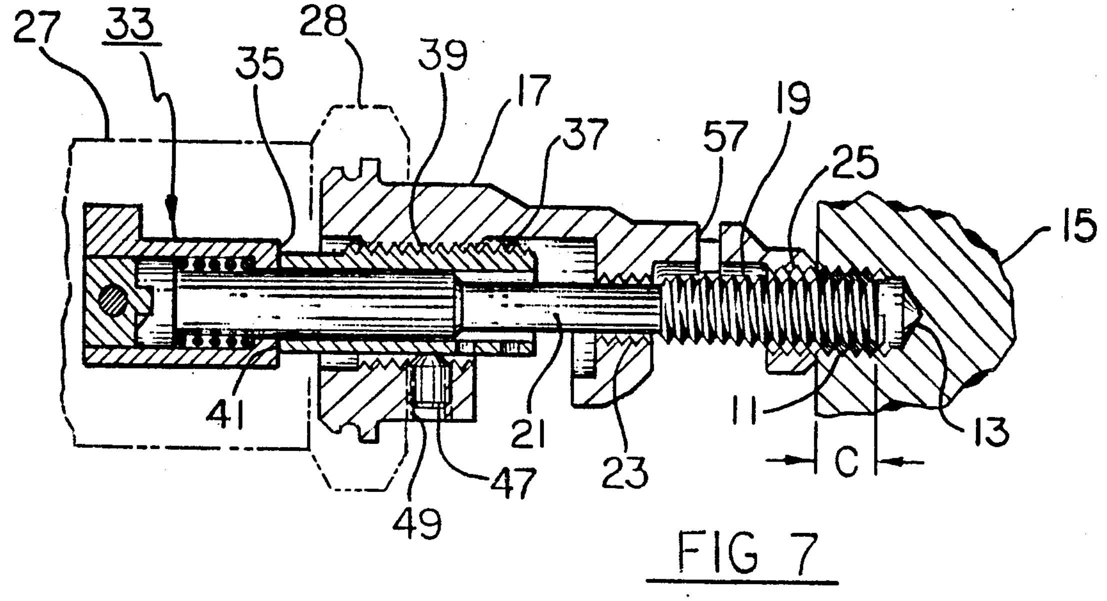
FIG. 7 is an enlarged sectional view of the installation tool, with the adjusting sleeve in an even further extended position from that of FIGS. 5 and 6, resulting in the helical coil insert being installed to a relatively shallow depth.

In FIG. 7, the adjusting sleeve 37 is retracted even further from the positions of FIGS. 5 and 6. The mandrel 21 can therefore be advanced by the air motor only a short distance, and the helical coil insert's insertion depth C is relatively shallow.

Figure 2:
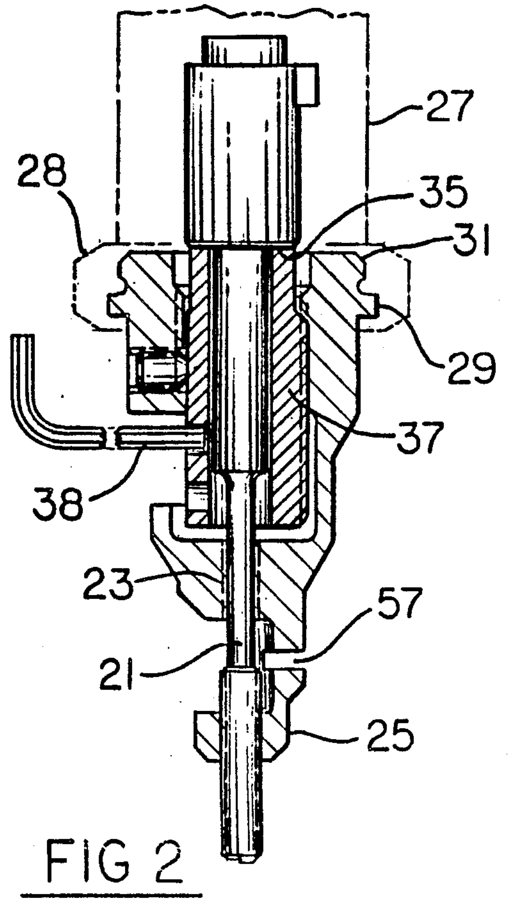
FIG. 2 is a sectional, side elevational view of the installation tool, with the front portion of an associated adaptor for an air motor being shown in phantom lines.
Figure 1:
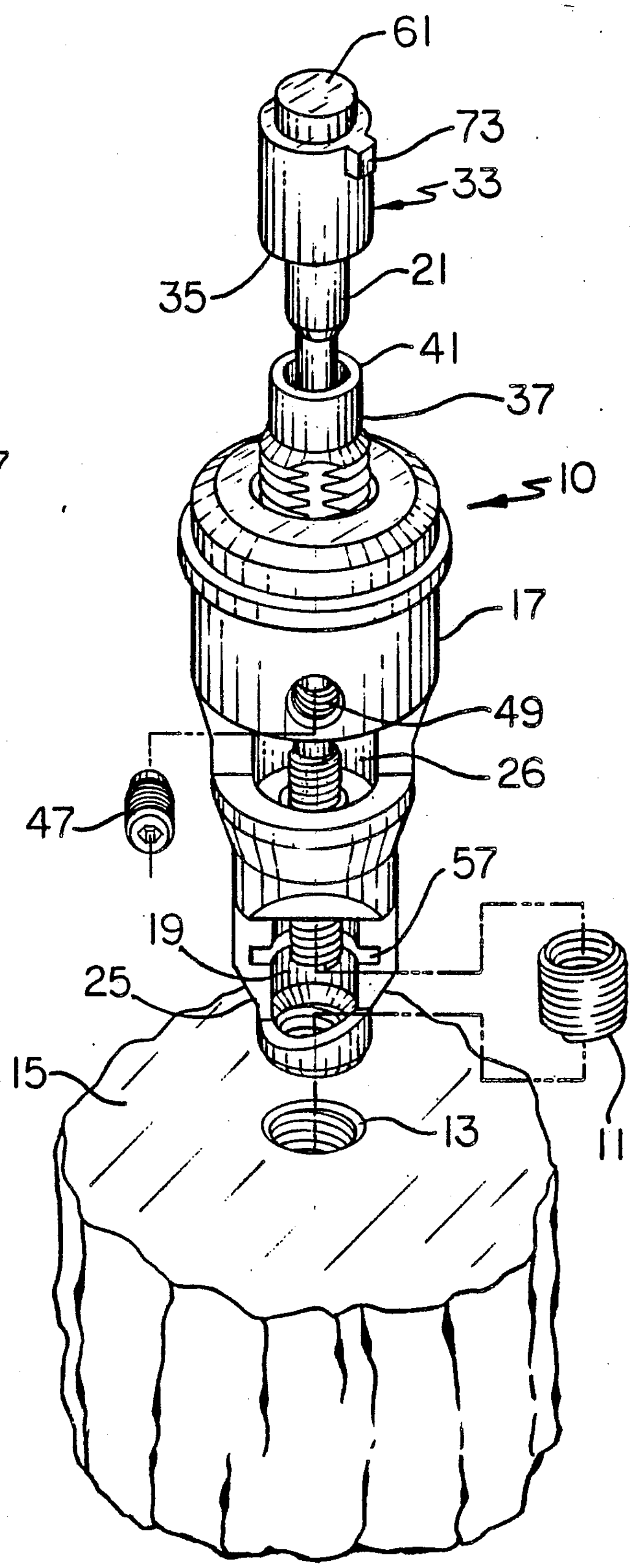
FIG. 1 is a perspective view of the preferred embodiment of a tool for installing a helical coil insert into a tapped hole in a workpiece.
Figure 4:
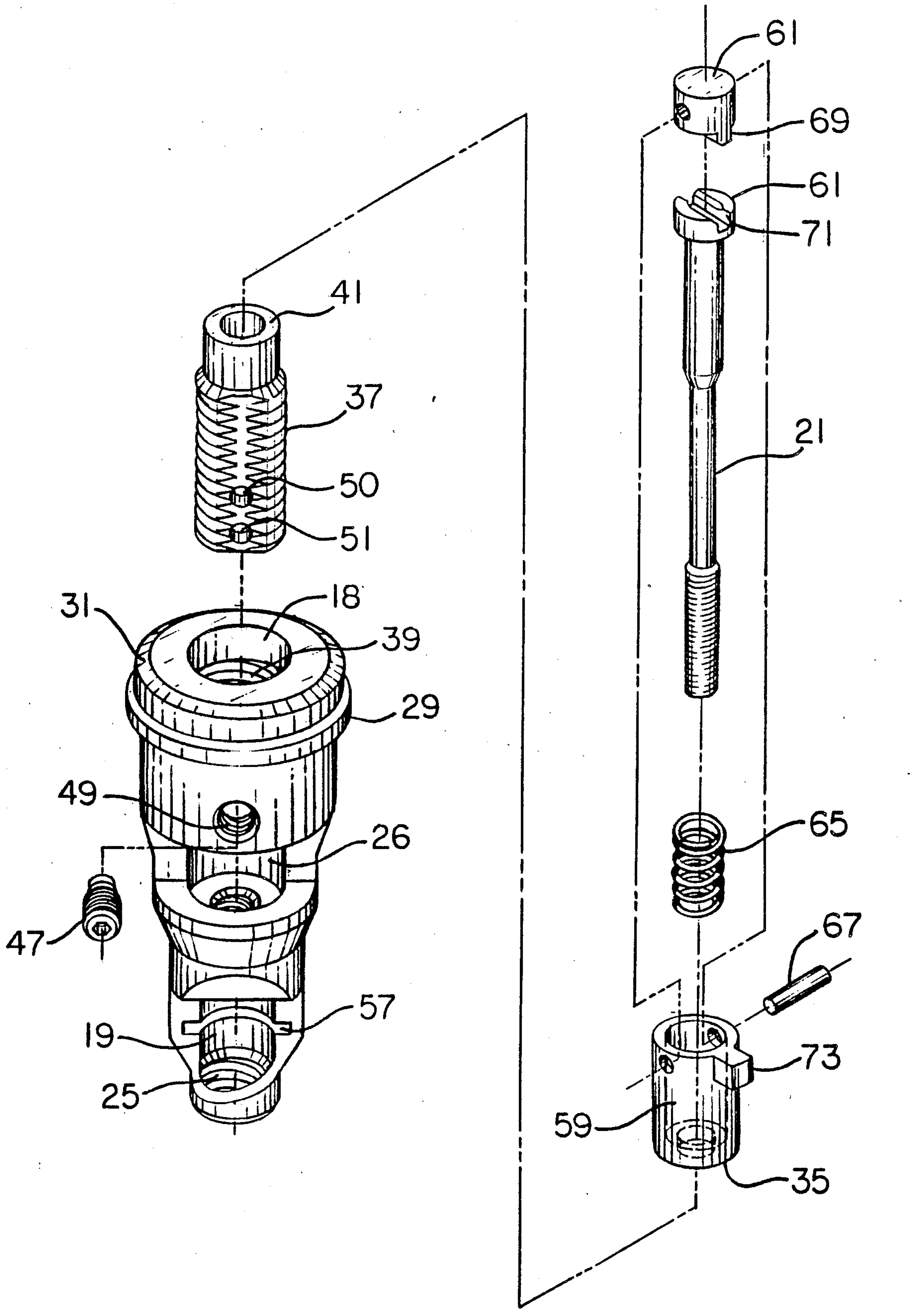
FIG. 4 is an exploded perspective view of the installation tool.

As shown in FIGS. 1, 2 and 4, the recess 19 at the lower end of the tool body 17 is sized to permit a convenient placement of the helical coil insert 11. A slot 57 on the back side of the recess facilitates automatic loading of a series of inserts carried on a plastic strip (not shown), as is conventional. The empty strip exits through the slot, while the next succeeding insert is loaded into the recess.

As best shown in FIG. 4, the clutch assembly 33 includes a clutch sleeve 59, two clutch elements 61 and 63 contained within the clutch sleeve, and compression spring 65 for urging the two clutch elements together. The first clutch element 61 is secured to the clutch sleeve by a transverse locking pin 67, and the second clutch element 63 is integral with the mandrel 21, forming its upper end. The respective clutch elements 61 and 63 include a mating tab 69 and notch 71, such that rotation of the first element is positively coupled to the second element.

In operation, the air motor rotatably drives the clutch sleeve 59, in a first direction, e.g., clockwise, via a tab 73 projecting from the sleeve's side. This rotates the first clutch element 61 and, in turn the second clutch element by the compression spring 65. Since the second clutch element is integral with the mandrel 21, this rotation threadedly advances the mandrel relative to the threaded section 23 of the tool bodY opening 18.

Eventually, the mandrel's leading end engages the helical coil insert 11 and rotatably drives it through the prewinder 25 and into the tapped hole 13. The mandrel will disengage from the threaded section 23 of the tool body at a point during the installation procedure however, the mandrel continues to advance relative to the tool body because it and the insert are then threadedly engaged With the tapped hole.

When the shoulder 35 on the lower end of the clutch sleeve 59 finally reaches the shoulder 41 of the upper end of the adjusting sleeve 37, further axial advancement of the clutch sleeve is prevented. Further rotation of the clutch sleeve and first clutch element 61 continues to advance the second clutch element 63 and the mandrel 21 however until the tab 69 and notch 71 of the respective clutch elements move out of engagement with each other. Thereafter, no further advancement of the mandrel can occur, and installation of the insert in the tapped hole is complete. Conventional air motors are designed to reverse rotation directions automatically when this has been accomplished. This withdraws the mandrel from the installed insert 11 by rotating in a second or reverse direction, e.g., counterclockwise.

It should be appreciated from the foregoing description that the present invention provides an improved tool for use in automatically installing a helical coil insert to a selected depth in a tapped hole. A special adjusting sleeve is threaded to a selected position in a tubular tool body to serve as a stop preventing further advancement of a mandrel that forces the insert into the tapped hole. The sleeve's position can be conveniently and precisely threaded into or out of the tool body, to adjust the insertion depth without requiring any disassembly of the mandrel from the tool body.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A tool for inserting a helical coil insert in a tapped hole formed in a workpiece, the tool comprising:

a tubular tool body having a threaded opening extending along its axis and having means at one end for carrying a helical coil insert in a fixed position, in alignment with the threaded opening, a cut out portion formed in said tool body spaced from said end means, said cut out portion allowing access to said opening;

a mandrel located in the threaded opening of the tool body and adapted to be moved from a position retracted from the helical coil insert, to a position in which it first engages the helical coil insert, and to be then moved a selectable distance to a selected installation position in which the helical coil insert is installed to a selected depth in the tapped hole of the workpiece;

driving means for applying a force to the mandrel sufficient to move it from the retracted position to the engagement position and then to the selected installation position, the driving means being connected to the mandrel at the end of the mandrel opposite the helical coil insert, the driving means including a limit member; and a sleeve threadedly received and selectively positioned in the threaded opening of the tool body, the sleeve being configured to be engaged by the limit member of the driving means to prevent further advancement of the driving means and mandrel, thereby defining the selected installation position of the mandrel and limiting the depth to which the helical coil insert is installed in the tapped hole, said sleeve having a flat area interrupting the exterior threads formed on said sleeve, at least one aperture being formed on said flat area, said aperture being adapted to receive a device to allow positioning of said sleeve relative to the tool body when said flat area is positioned to be visible through said cut out portion, whereby the sleeve can be controllably threaded without requiring disassembly of the driving means from the mandrel.

2. The tool as defined in claim 1 further comprising a threaded, radially-aligned opening in the tool body, and a set screw threadedly received in the radially-aligned opening of the tool body, rotation of the set screw bringing it into contact with the flat area of the sleeve, thereby locking the sleeve in a predetermined position within the tool body.

3. A tool for inserting a helical coil insert in a tapped hole formed in a workpiece, the tool comprising:

a tubular tool body having a threaded opening extending along its axis and having means at one end for carrying a helical coil insert in a fixed position in alignment with the threaded opening, a cut out portion formed in said tool body spaced from said end means, said cut out portion allowing access to said opening;

a mandrel located in the threaded opening of the tool body and adapted to be move from a position retracted from the helical coil insert to a position in which it first engages the helical coil insert, and to be then moved a selectable distance to a selected installation position in which the helical coil insert is installed to a selected depth in the tapped hole of the workpiece;

driving means for applying a force to the mandrel sufficient to move it from the retracted position to the engagement position and then to the selected installation position, the driving means being connected to the mandrel at the end of the mandrel opposite the helical coil insert, the driving means including a limit member; and a sleeve threadedly received and selectively positioned in the threaded opening of the tool body, the sleeve being configured to be engaged by the limit member of the driving means and prevent further advancement of the driving means and mandrel, thereby defining the selected installation position of the mandrel and limiting the depth to which the helical coil insert is installed in the tapped hole, said sleeve having a plurality of flat areas interrupting the exterior threads formed on said sleeve, at least one aperture being formed in each of said plurality of flat areas, said aperture being adapted to receive a device to allow positioning of said sleeve relative to the tool body when said flat area is positioned to be visible through said cut out portion, whereby the sleeve can be controllably threaded without requiring any disassembly of the driving means from the mandrel.

4. The tool as defined in claim 3 wherein each of said apertures formed in said flat areas is adapted to receive a device to allow positioning of said sleeve relative to the tool body.

5. The tool as defined in claim 4 wherein at least two apertures are formed in each flat area.

6. The tool as defined in claim 3 further comprising a threaded, radially-aligned opening in said tool body, and a set screw threadedly received in the radially-aligned opening of the tool body, rotation of the set screw bringing it into contact with one of the plurality of flat areas of the sleeve thereby locking the sleeve in a predetermined position within the tool body.

7. A tool for inserting a helical coil insert in a tapped hole formed in a workpiece, the tool comprising:

a tubular tool body having a threaded opening extending along its axis and having means at one end for carrying a helical coil insert in a fixed position, in alignment with the threaded opening, a cut out portion being formed in a portion of said tool body spaced from said helical coil carrying means allowing access to said opening;

a mandrel located in the threaded opening of the tool body and adapted to be move a fixed distance from a predetermined retracted position, in which it is retracted from the helical coil insert to a predetermined engagement position in which it first engages the helical coil insert, and to be then moved a selectable distance to a selected installation position in which the helical coil insert is installed to a selected depth in the tapped hole of the workpiece;

driving means for applying a force to the mandrel sufficient to move it from its predetermined retracted position to its predetermined engagement position to and then to its selected installation position the driving means being connected to the mandrel at the end of the mandrel opposite the helical coil insert, and wherein the driving means includes limit means; and a sleeve threadedly received and selectively positioned in the threaded opening of the tool body, the sleeve being configured to be engaged by said limit means to prevent further advancement of the driving means and mandrel, thereby defining the selected installation position of the mandrel and limiting the depth to which the helical coil insert is installed in the tapped hole, said sleeve further comprising a plurality of flat areas interrupting the exterior threads formed on said sleeve and at least one aperture formed on each flat area, each of said apertures adapted to receive a device when the flat area containing the aperture is positioned to be visible through said cut out portion to allow positioning of said sleeve relative to the tool body.

8. The tool as defined in claim 7 further comprising a threaded, radially-aligned opening in the tool body, and a set screw threadedly received in the radially-aligned opening of the tool body, rotation of the set screw bringing it into contact with the flat area of the sleeve visible through said tool body cut out portion thereby locking the sleeve in a predetermined position within the tool body.

9. The tool as defined in claim 7 wherein at least a portion of one of said flat areas is always visible through said cut out portion.

* * * * *